(12) United States Patent
Grabbe et al.

(10) Patent No.: US 11,275,386 B2
(45) Date of Patent: Mar. 15, 2022

(54) METHOD FOR OPERATING AN INDUSTRIAL TRUCK

(71) Applicant: Jungheinrich AG, Hamburg (DE)

(72) Inventors: Florian Grabbe, Hamburg (DE); Stefan Ahrens, Rellingen (DE); Sven-Ole Heise, Osterrönfeld (DE); Jan Kopelke, Hamburg (DE); Tony Altmann, Brokstedt (DE)

(73) Assignee: Jungheinrich AG, Hamburg (DE)

( * ) Notice: Subject to any disclaimer, the term of this patent is extended or adjusted under 35 U.S.C. 154(b) by 77 days.

(21) Appl. No.: 16/292,447

(22) Filed: Mar. 5, 2019

(65) Prior Publication Data

US 2019/0271990 A1 Sep. 5, 2019

(30) Foreign Application Priority Data

Mar. 5, 2018 (DE) ..................... 10 2018 104 986.2

(51) Int. Cl.
  *B66F 17/00* (2006.01)
  *G05D 1/00* (2006.01)
  *G05D 1/02* (2020.01)

(52) U.S. Cl.
  CPC ......... *G05D 1/0289* (2013.01); *B66F 17/003* (2013.01); *G05D 1/0088* (2013.01); *G05D 1/0297* (2013.01); *G05D 2201/0216* (2013.01)

(58) Field of Classification Search
  CPC .. B66F 17/003; G05D 1/0289; G05D 1/0088; G05D 1/0297; G05D 2201/0216; G05D 1/021; G05D 1/0212; G05D 1/0214; B62D 15/0275; B62D 15/0265; B62D 15/028; B62D 15/0285; B62D 15/0295; B25J 19/005; B25J 5/007; G01S 17/931; G01S 17/89; B60W 30/00; G01C 21/3602; G01C 21/3446
  USPC ......................................................... 701/23
  See application file for complete search history.

(56) References Cited

U.S. PATENT DOCUMENTS

| 2007/0069907 A1 | 3/2007 | Magens |
| 2008/0051952 A1* | 2/2008 | Tushaus .................... B66F 9/24 701/25 |
| 2011/0093134 A1 | 4/2011 | Emanuel et al. |
| 2014/0159888 A1* | 6/2014 | Gauger ..................... F16P 3/14 340/438 |

(Continued)

FOREIGN PATENT DOCUMENTS

| DE | 102013100200 A1 | 7/2014 |
| EP | 1767488 A2 | 3/2007 |

(Continued)

*Primary Examiner* — Abby Y Lin
*Assistant Examiner* — Hossam M Abd El Latif
(74) *Attorney, Agent, or Firm* — Rankin, Hill & Clark LLP

(57) ABSTRACT

A method for operating an industrial truck (20) in a goods logistics facility (10). The absolute position of the industrial truck (20) in the goods logistics facility (10) is determined and the direction of travel of the industrial truck (20) in the goods logistics facility (10) is determined, and a dynamically adaptable and/or modifiable industrial truck extension zone (30) is determined as a function of the absolute position determined and the direction of travel determined for the industrial truck (20) in the goods logistics facility (10), preferably at predetermined periods of time.

16 Claims, 3 Drawing Sheets

(56) References Cited

U.S. PATENT DOCUMENTS

| | | | | |
|---|---|---|---|---|
| 2015/0170498 A1* | 6/2015 | Beggs | ................... | B60Q 9/008 |
| | | | | 340/686.6 |
| 2016/0140847 A1* | 5/2016 | Kawamata | ............. | G08G 1/166 |
| | | | | 701/36 |
| 2016/0180713 A1* | 6/2016 | Bernhardt | ............. | B66F 17/003 |
| | | | | 701/70 |
| 2018/0059682 A1 | 3/2018 | Thode | | |

FOREIGN PATENT DOCUMENTS

| | | | | |
|---|---|---|---|---|
| EP | 2442112 A2 * | 4/2012 | ............... | G01P 1/122 |
| EP | 3369696 A1 * | 9/2018 | ........... | B62B 3/0618 |
| JP | 2015170284 A | 9/2015 | | |
| WO | 2015121818 A2 | 8/2015 | | |
| WO | WO-2015121818 A2 * | 8/2015 | ............ | E02F 9/2033 |

* cited by examiner

METHOD FOR OPERATING AN INDUSTRIAL TRUCK

PRIORITY CLAIM

This application claims priority to DE 10 2018 104 986.2, filed Mar. 5, 2018, which is hereby incorporated by reference in its entirety.

BACKGROUND OF INVENTION

Field of Invention

The invention relates to a method for operating an industrial truck in a goods logistics facility.

Brief Description of Related Art

It is known in prior art that industrial trucks in logistics facilities, for example in warehouses or high-bay storage facilities for goods and products, must be moved with the possibly greatest speed in order to transport the goods and products in a fast and efficient manner from or to their storage locations. Various industrial trucks are generally used for this; they are guided by operating personnel or a driver or automatically, for example by the use of induction loops or the like.

In order to support a driver of an industrial truck in handling the industrial truck, for example, EP 1 767 488 A2 discloses a system for supporting a driver of an industrial truck during travel.

Driving assistance systems are also used on or in the industrial trucks in order to guide the industrial trucks, whereby the industrial truck are influenced or the driver is informed, for example if driving ought to be slower in an area of risk or if no goods should be placed on particular surfaces or in particular areas. Such limitations in the guidance of industrial trucks are locally limited in each case and consequently concern only individual zones within a goods logistics facility.

The object of the invention is to improve the handling of an industrial truck in a goods logistics facility.

BRIEF SUMMARY OF THE INVENTION

The object is solved by a method for operating an industrial truck in a goods logistics facility, wherein the absolute position of the industrial truck in the goods logistics facility is or will be determined and wherein the direction of travel of the industrial truck in the goods logistics facility is or will be determined, wherein a dynamically adaptable and/or modifiable industrial truck extension zone is determined as a function of the absolute position determined and the direction of travel determined for the industrial truck in the goods logistics facility, preferably at predetermined periods of time.

The invention is based on the idea that a virtual industrial truck extension zone is determined or calculated for an industrial truck, wherein in particular the industrial truck extension zone is modifiable as a function of the vehicle condition and/or as a function of the driving dynamics of the industrial truck. For example, for a standing vehicle, the industrial truck extension zone is smallest and runs at a short distance parallel to a contour of the industrial truck on the floor of the goods logistics facility. A zone is determined via the industrial truck extension zone, which, depending on the movement status of the industrial truck, indicates the area in which the industrial truck will move based on the direction of movement and the type of movement, wherein a type of protection zone for the industrial truck is determined in this manner in order to avoid collisions with another industrial truck.

A further advantage of the invention consists of the industrial truck extension zone for an industrial truck is determined taking into account obstacles, preferably stationary, in the goods logistics facility, because in this way the industrial truck extension zone is also determined for the subarea which, seen from the industrial truck, is obscured or concealed behind the obstacle. In this way, the industrial truck extension zone for the industrial truck is also determined with the inclusion of the subarea concealed by the obstacle.

In particular, the specific industrial truck extension zone around the respective industrial truck is determined based on the absolute position in the goods logistics facility, for example in a warehouse or the like, and based on the direction of travel, i.e. orientation or position respectively of the industrial truck in the goods logistics facility. In order to determine the absolute position and direction of travel in the goods logistics facility, corresponding transmitting and receiving apparatuses, preferably stationary, for example anchor nodes or the like, and possibly locating apparatuses are provided in order to determine the absolute position of the industrial truck and its direction of travel and/or orientation. This preferably takes place at regular time intervals.

In order to determine the absolute position of the or of an industrial truck, according to one embodiment there are, for example, a plurality of permanently installed anchor nodes present in the goods logistics facility, which represent reference points in a shared coordinate system. The position of the respective industrial truck is determined in the coordinate system using measurements of the distance to multiple anchor nodes by a positioning system.

A permanently installed network of reference points, for example WLAN access points or the like, are used to determine position. Determining position and the orientation of an industrial truck in the goods logistics facility takes place, for example, by multilateration, i.e. a measurement of distance or spacing from three different points, in this case reference points of the system. The measurement of distance or spacing takes place, for example, with the aid of a propagation delay measurement. The reference points are to be designated as anchor nodes. Their positions, assumed to be known, serve as reference points in a shared coordinate system. Thus, the anchor nodes are also represented and/or referenced in a shared coordinate system. In order that the anchor nodes used as reference points can also serve as fixed points for the determination of an absolute position in the shared coordinate system, the positions of the anchor nodes are determined or are known.

According to one further development of the method, it is provided for this that the industrial truck extension zone is determined as a function of the, preferably current, travel speed of the industrial truck. This makes it possible that, for example, with an increase of travel speed the industrial truck extension zone is enlarged in the direction of movement of the industrial truck, whereas with a reduction of the travel speed of the industrial truck the industrial truck extension zone is reduced with reference to the direction of travel of the industrial truck. The industrial truck extension zone is smallest when the industrial truck is motionless.

Moreover, according to a further aspect of the method, it is envisaged that the industrial truck extension zone is determined as a function of the direction of travel and/or of the movement path of the industrial truck. Thereby the industrial truck extension zone is adapted accordingly, for example when the industrial truck is cornering, with a future position of the industrial truck taken into consideration here in determining the industrial truck extension zone and, for example, the steering angle or possibly the engine speed of the industrial truck taken into consideration as a function of the speed of the industrial truck.

Furthermore, the use of the industrial truck extension zone makes it possible for the industrial trucks to drive past one another without collision in a goods logistics facility even with close spacing.

According to another aspect, the industrial truck extension zone is preferably determined as a function of the vehicle type of the industrial truck. Here, for example, when determining the industrial truck extension zone, it can be taken into account that the industrial truck is a counterbalance lift truck, an order-picking forklift, a tractor, a high-reach forklift, a narrow-aisle forklift, a heavy load forklift, a side loader or the like. Depending on the vehicle type, corresponding specific industrial truck extension zones are determined in this as a function of the outer contour of the respective industrial truck. Here too, the type of drive in the vehicle type—for example, an electric drive, etc.—can be taken into account.

Moreover, according to a preferred embodiment of the method, it is provided that the industrial truck extension zone is determined as a function of the vehicle characteristics of the industrial truck and/or as a function of one or more characteristics of an attached apparatus mounted on the industrial truck. If, for example, an attached apparatus, for example a bale grabber, is attached to the industrial truck, then the specific industrial truck extension zone is expanded or enlarged or adapted compared to the industrial truck without the attachment, taking into account the contour of the attached apparatus. As a result, the industrial truck extension zone is modified accordingly depending on the attached apparatus.

According to another aspect of the method, it is provided that the industrial truck extension zone is preferably determined as a function of the driving qualification of a driver of the industrial truck. Here it is possible that the industrial truck extension zone is modified or adapted based on persons, wherein it is possible, for example, to constitute the industrial truck extension zone smaller, for example, with an experienced driver of the industrial truck compared to a driver with less experience in handling the industrial truck, for whom the industrial truck extension zone is enlarged correspondingly.

Moreover, one embodiment of the method is distinguished in that the industrial truck extension zone is determined as a function of the characteristics, in particular type and/or weight and/or size, of goods transported or to be transported by means of the industrial truck. This makes it possible for the industrial truck extension zone for the industrial truck to be determined as a function, for example, of the weight or other physical characteristics of the goods. For example, with a heavy load, for example on the forks of the industrial truck, the industrial truck extension zone is extended in the conveying direction, which causes the possibility of a collision with another vehicle or another dangerous situation to be recognized at an early stage or in a timely manner with the use of the expanded or enlarged industrial truck extension zone. If the industrial truck is also designed as a tractor, the industrial truck extension zone can also be adapted correspondingly here, because, for example, the number and/or the type of trailer is taken into account in determining the industrial truck extension zone. The industrial truck extension zone can also be determined as a function of the length or size of the goods, for example with long goods by a multidirectional forklift, in particular an electric multidirectional forklift.

Furthermore, according to another aspect of the method, it is provided that the industrial truck extension zone is determined as a function of the operation time of the industrial truck in the goods logistics facility. If, for example, an industrial truck is used in a multiple shift system in the goods logistics facility, then at times in which an increased number of persons can be expected, for example before or after a break or during a change of shift, the industrial truck extension zone is adapted accordingly, because at these times an increased number of persons can be expected in the goods logistics facility. In this case, the industrial truck extension zone is preferably enlarged compared to other times.

Moreover, in one embodiment of the method it is advantageous that the industrial truck extension zone is determined as a function of the environment of the goods logistics facility, which can be driven in by the industrial truck, and/or as a function of the traffic density of industrial trucks in an area of the goods logistics facility. If, for example, the industrial truck or the control device of the industrial truck is connected with a central control device of the goods logistics facility, for example a goods management system, then corresponding information and data on how many industrial trucks are in the area of the goods logistics facility can be transmitted by the central control device of the goods logistics facility to the industrial truck. Here the industrial truck extension zone of the individual industrial trucks can be specifically adapted correspondingly as a function of the number of industrial ucks in a predetermined area of the goods logistics facility.

Furthermore, within the scope of the invention it is possible to determine whether an industrial truck is used in the outside area or in an inside area of the goods logistics facility, so that, for example, with the use of the industrial truck in an inside area the industrial truck extension zone differs from the industrial truck extension zone of another industrial truck in the outside area of the goods logistics facility. Here, depending on whether the industrial truck is used in the outside area or in the inside area of the goods logistics facility, the industrial truck extension zone is determined as a function of the environment, in particular the outside area or the inside area, in which the industrial truck can be driven. This achieves a determination of the industrial truck extension zone which depends on the environment, whereby the efficiency of use for the industrial trucks is increased. If an industrial truck is used in the outside area of the goods logistics facility, then with the use of further sensors, for example satellite-protected position determination equipment or the like, the position of the industrial truck can be determined in the outside area of the goods logistics facility, wherein the industrial truck extension zone of the industrial truck is also determined accordingly for this.

Moreover, it is preferred with the method that the absolute position of the industrial truck in the goods logistics facility and/or the direction of travel of the industrial truck in the goods logistics facility is determined and/or checked at, preferably regular, time intervals. This preferably takes place automatically.

A further development of the method is also distinguished in that, after determination of the industrial truck extension zone, data for the industrial truck extension zone are transmitted, preferably wirelessly, from the industrial truck to another industrial truck and/or to a, preferably central, control device of the goods logistics facility, preferably wirelessly. Using the data for the industrial truck extension zone, it can be determined, for example, whether the risk or possibility of a collision exists between two industrial trucks within an area. This enables a possible collision to be recognized and avoided at an early stage in an efficient manner.

In one embodiment of the method, it is also envisaged for this that from a second industrial truck data regarding the industrial truck extension zone of the second industrial truck are transmitted, preferably wirelessly, to the industrial truck. In particular, the data on the respective industrial truck extension zones are exchanged between two industrial trucks if, by means of a distance sensing device of the industrial truck, it is determined that a second industrial truck is located in a predetermined range of the industrial truck, so that after detection of the second industrial truck at a predetermined distance, the data on the specific industrial truck extension zone is exchanged between the industrial trucks. The industrial trucks have corresponding transmitting and receiving units for this in each case.

For example, the distance sensing device of the industrial truck has a laser, a radar sensor or an ultrasound sensor. Moreover, it is provided in one embodiment that the spacing of two industrial trucks is determined using positioning information for the two industrial trucks which is preferably determined or can be determined.

Moreover, in one embodiment of the method it is advantageous that with the use of data for the industrial truck extension zone of the industrial truck and the use of data transmitted for the industrial truck extension zone of the second industrial truck it is determined whether the industrial truck extension zone of the industrial truck and the industrial truck extension zone of the second industrial truck partially overlap or touch one another, wherein upon determining a partial overlap or touching of the industrial truck extension zone and the second industrial truck extension zone a warning message, in particular a collision warning message, is generated and/or the industrial truck is, preferably automatically, braked and/or the industrial truck is, preferably automatically, controlled.

Here it is provided that the industrial truck extension zone is determined by using an onboard computer of the industrial truck. The determination of a partial overlap or touching of the industrial truck extension zone with an industrial truck extension zone of a second industrial truck also takes place using the onboard computer of the industrial truck.

To display a possible collision, for example with a partial overlap or touching of the industrial truck extension zone and the industrial truck extension zone of the second vehicle, to the driver of the industrial truck, it is provided that the warning message be shown on a display of the industrial truck and/or the warning message is generated as an acoustic and/or mechanical warning signal, preferably at or on the industrial truck.

In particular, the method is executed by means of an onboard computer of the industrial truck, wherein in particular the determination of the industrial truck extension zone and/or the determination of a partial overlap or touching of the industrial truck extension zone with an industrial truck extension zone of a second vehicle and/or the generation of a warning message, in particular a collision warning message, is carried out by means of the onboard computer.

Further features of the invention will become apparent from the description of the inventive embodiments together with the claims and the attached drawings. Inventive embodiments can implement individual features or a combination of multiple features.

BRIEF DESCRIPTION OF THE DRAWINGS

The invention is described below, without restricting the general intent of the invention, based on examples with reference to the drawings; we expressly refer to the drawings with regard to the disclosure of all details according to the invention that are not explained in greater detail in the text. In the figures.

In the drawings, the same or similar types of elements and/or parts are given the same reference numbers so that these need not be reintroduced in each case.

DETAILED DESCRIPTION OF THE INVENTION

Figure 1:
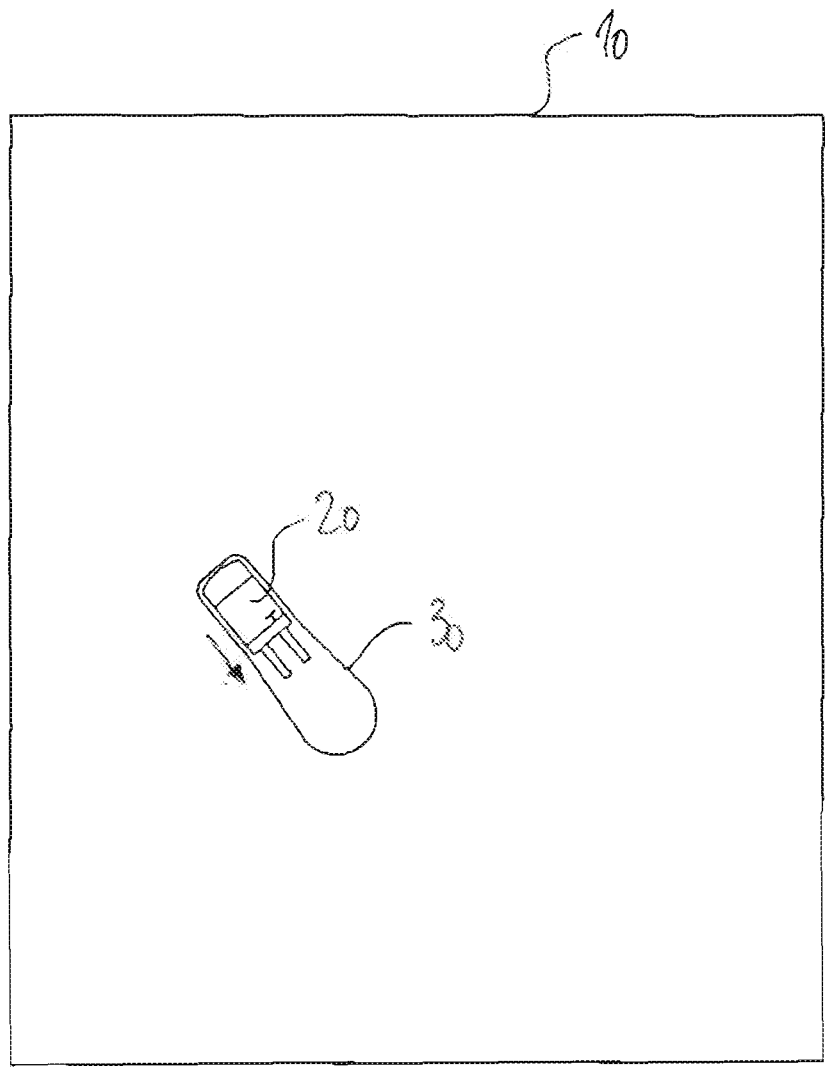
FIG. 1 shows a simplified schematic representation of a goods logistics facility with an industrial truck.

FIG. 1 shows a simplified schematic representation of a goods logistics facility 10, for example embodied as a warehouse or the like. The goods logistics facility comprises, for example, a warehouse in which multiple racks (not shown here) are situated adjacent to one another, wherein corresponding goods are placed onto or removed from the racks here. Here multiple industrial trucks are provided in the goods logistics facility 10, so that the goods are transported in the goods logistics facility 10 by means of the industrial trucks.

In FIG. 1, an exemplary industrial truck 20 is drawn schematically, wherein the industrial truck 20 is moved inside the goods logistics facility 10.

The orientation of the industrial truck 20 is determined by means of an onboard computer of the industrial truck 20 with the use of corresponding transmitting and receiving units (not illustrated here) in the goods logistics facility 10. Furthermore, the speed of the industrial truck 20 is also determined. A virtual industrial truck extension zone 30 is determined by means of an onboard computer of the industrial truck 20 as a function of the absolute position determined and the orientation of the industrial truck 20 determined in the goods logistics facility 10.

Here the extension zone 30 is determined taking into account the direction of travel and/or orientation respectively of the industrial truck 20 in the goods logistics facility 10. In other embodiments, the extension zone 30 is modifiable as a function of parameters, such as speed, steering angle or other sizes. As an example, the area of the extension zones 30 can be changed by the direction of travel or the change of the direction of travel and by a steering angle and the change of speed.

Figure 2A:
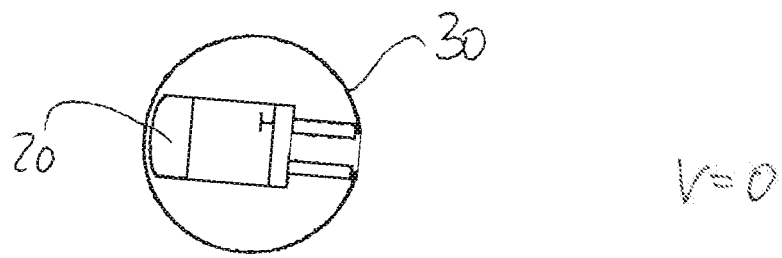
FIG. 2a shows a schematic industrial truck stopped, with an extension zone.

In FIG. 2a, the contour zone 30 is drawn for an industrial truck 20, with the industrial truck 20 being stopped. However, with this industrial truck 20 in FIG. 2a, the direction of travel in the goods logistics facility 10 is not known or determined. This results in a circular extension zone 30 around the industrial truck 20.

Figure 2B:
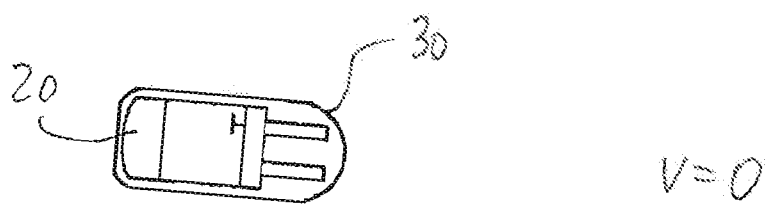
FIGS. 2b to 2d show in each case a schematic industrial truck with an inventive extension zone at various speeds of the industrial truck.

In contrast to this, FIG. 2b shows an industrial truck 20 with an extension zone 30, where the orientation of the industrial truck 20 in the goods logistics facility is known and taken into account. Here the industrial truck 20 is also stopped. As can be seen by comparison with FIG. 2a, the extension zone 30 is close by and has a smaller area compared to the industrial truck 20 in FIG. 2a, in which no orientation in the goods logistics facility is known or determined (cf. FIG. 2a).

Figure 2C:
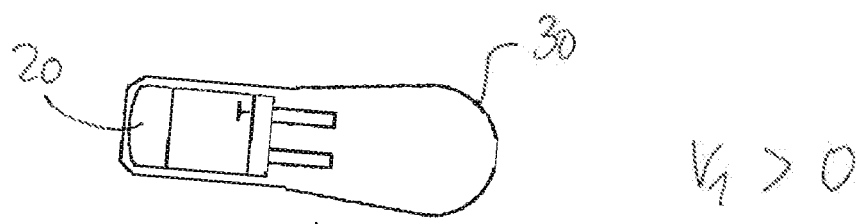
Figure 2D:

FIG. 2c shows the industrial truck 20 in motion, where the extension zone 30 is extended in the manner of a drumstick in the direction of travel of the industrial truck. If the speed of the industrial truck 20 is increased further, the extension zone 30 is enlarged, as shown in FIG. 2d.

Figure 3A:
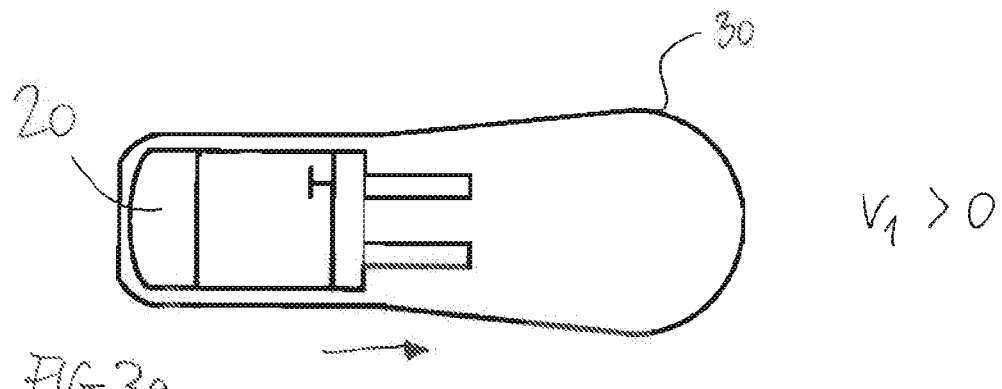
FIG. 3a shows a schematic industrial truck without attached apparatus with a contour zone.

The industrial truck 20 shown in FIG. 3a corresponds to the industrial truck 20 in FIG. 2c. Here the industrial truck 20 is moved at a speed greater than 0 m/s, which expands and widens the extension zone 30 like a drumstick in the direction of travel of the industrial truck 20. In determining the extension zone 30, the geometry of apparatuses attached to an industrial truck 20 is also taken into account, for example.

Figure 3B:
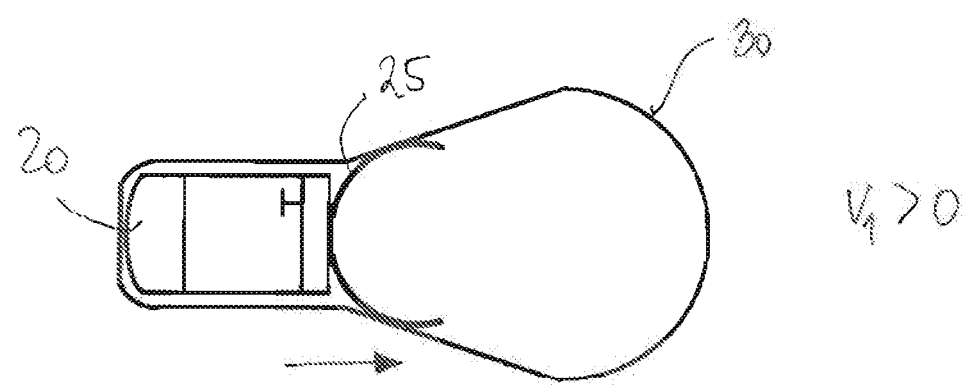
FIG. 3b shows a schematic industrial truck with an attached apparatus and an inventive extension zone.

FIG. 3b shows an industrial truck 20, which has a bale grabber 25 instead of a fork (cf. FIG. 3a). The arrangement of the bale grabber 25 changes the vehicle contour, wherein the geometry of the bale grabber 25 is taken into account in determining the extension zone 30 and the extension zone 30 having a greater width in the direction of travel than for an industrial truck 20 with a fork (cf. FIG. 3a).

Figure 3C:
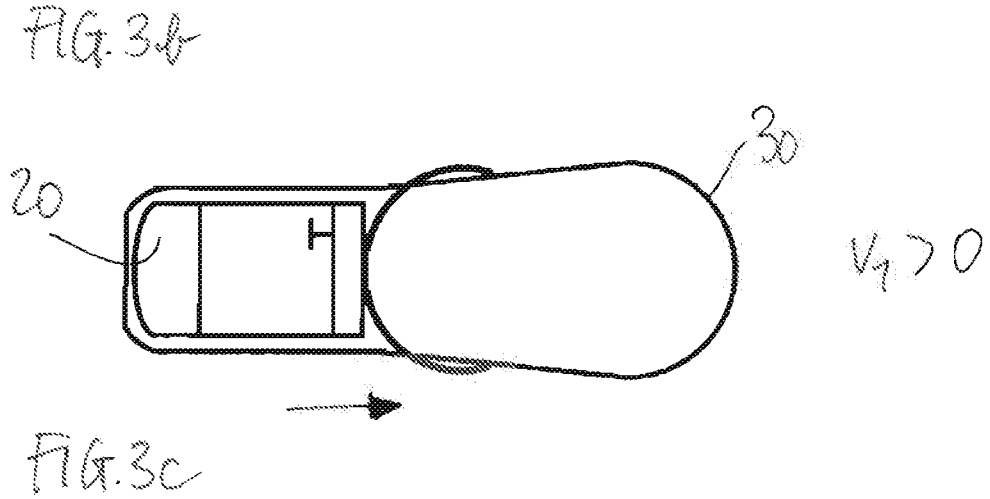
FIG. 3c shows a schematic industrial truck with an extension zone and attached apparatus.

For comparison with this, FIG. 3c shows the industrial truck 20 with a bale grabber 25, while FIG. 3c shows the extension zone 30 as it is represented for an industrial truck 20 with a fork (cf. FIG. 3a). Here the extension zone 30 is not adapted as a function of the geometry of the bale grabber 25.

According to the invention, in determining the dynamically adaptable and/or modifiable industrial truck extension zone 30, multiple parameters, such as attached apparatuses and the loading of the goods transported or to be transported or the weight and other parameters, are taken into account in embodiments.

All of the indicated features, including those which are to be inferred from the drawings alone, as well as individual features which are disclosed in combination with other features are deemed essential to the invention, both alone and in combination. Inventive embodiments can be fulfilled with individual characteristics or a combination of multiple characteristics. Within the context of the invention, features to which the terms "in particular" or "preferably" are applied are to be understood as optional features.

REFERENCE NUMBER LIST

10 Goods logistics facility
20 Industrial truck
25 Bale grabber
30 Extension zone

What is claimed is:

1. A method for operating a first industrial truck in a goods logistics facility, the method comprising:
determining an absolute position of the first industrial truck in the goods logistics facility, a direction of travel of the first industrial truck in the goods logistics facility and a movement path of the first industrial truck;
determining an absolute position of a second industrial truck in the goods logistics facility, a direction of travel of the second industrial truck in the goods logistics facility and a movement path of the second industrial truck;
determining a dynamically adaptable and/or modifiable first virtual industrial truck extension zone as a function of at least the determined absolute position of the first industrial truck, the direction of travel for the first industrial truck in the goods logistics facility and the movement path of the first industrial truck; and
determining a dynamically adaptable and/or modifiable second virtual industrial truck extension zone as a function of at least the determined absolute position of the second industrial truck, the direction of travel for the second industrial truck in the goods logistics facility and the movement path of the second industrial truck;
wherein, when the first industrial truck is cornering, the determined first virtual industrial truck extension zone is adapted with a future position of the first industrial truck taken into consideration,
wherein, when the second industrial truck is cornering, the determined second virtual industrial truck extension zone is adapted with a future position of the second industrial truck taken into consideration,
wherein data for the adapted first and second virtual industrial truck extension zones is transmitted between the first and second industrial trucks, and
wherein, after the data for the adapted first and second virtual industrial truck extension zones is transmitted between the first and second industrial trucks, an onboard computer of the first industrial truck determines whether the adapted first virtual industrial truck extension zone and the adapted second virtual industrial truck extension zone partially overlap or touch one another.

2. The method according to claim 1, wherein the first virtual industrial truck extension zone is also determined as a function of a travel speed of the first industrial truck.

3. The method according to claim 1, wherein the first virtual industrial truck extension zone is also determined as a function of a vehicle type of the first industrial truck.

4. The method according to claim 1, wherein the first virtual industrial truck extension zone is also determined as a function of vehicle characteristics of the first industrial truck and/or as a function of one or more characteristics of an apparatus attached to the first industrial truck.

5. The method according to claim 1, wherein the first virtual industrial truck extension zone is also determined as a function of driving qualification of a driver of the first industrial truck.

6. The method according to claim 1, wherein the first virtual industrial truck extension zone is also determined as a function of a type and/or a weight and/or a size of goods transported or to be transported by the first industrial truck.

7. The method according to claim 1, wherein the first virtual industrial truck extension zone is also determined as a function of operation time of the first industrial truck in the goods logistics facility.

8. The method according to claim 1, wherein the first virtual industrial truck extension zone is also determined as a function of an environment of the goods logistics facility drivable for the first industrial truck and/or as a function of traffic density of industrial trucks in the area of the goods logistics facility.

9. The method according to claim 1, wherein the absolute position of the first industrial truck in the goods logistics facility and/or the direction of travel of the first industrial truck in the goods logistics facility is determined at regular time intervals.

10. The method according to claim 1, further wherein, when the onboard computer of the first industrial truck determines that the adapted first virtual industrial truck extension zone and the adapted second virtual industrial truck extension zone partially overlap or touch one another, at least one of:

warning message is generated at the first industrial truck;
the first industrial truck is braked; and
operation of the first industrial truck is controlled.

11. The method according to claim 10, wherein the warning message is shown on a display of the first industrial truck and/or the warning message is generated as an acoustic and/or mechanical warning signal.

12. A method for operating a first industrial truck in a goods logistics facility, the method comprising:

determining an absolute position of the first industrial truck in the goods logistics facility, a direction of travel of the first industrial truck in the goods logistics facility and a movement path of the first industrial truck;

determining an absolute position of a second industrial truck in the goods logistics facility, a direction of travel of the second industrial truck in the goods logistics facility and a movement path of the second industrial truck;

determining a dynamically adaptable and/or modifiable first virtual industrial truck extension zone as a function of at least the determined absolute position of the first industrial truck, the direction of travel for the first industrial truck in the goods logistics facility and the movement path of the first industrial truck; and determining a dynamically adaptable and/or modifiable second virtual industrial truck extension zone as a function of at least the determined absolute position of the second industrial truck, the direction of travel for the second industrial truck in the goods logistics facility and the movement path of the second industrial truck;

wherein, when the first industrial truck is cornering, the determined first virtual industrial truck extension zone is adapted with a future position of the first industrial truck taken into consideration, wherein, when the second industrial truck is cornering, the determined second virtual industrial truck extension zone is adapted with a future position of the second industrial truck taken into consideration, wherein data for the adapted first and second virtual industrial truck extension zones is transmitted to a control device of the goods logistics facility, and wherein, after the data for the adapted first and second virtual industrial truck extension zones is transmitted to the control device of the goods logistics facility, the control device of the goods logistics facility determines whether the adapted first virtual industrial truck extension zone and the adapted second virtual industrial truck extension zone partially overlap or touch one another.

13. The method according to claim 12, wherein the first virtual industrial truck extension zone is also determined as a function of any one or more of:

a travel speed of the first industrial truck;
a vehicle type of the first industrial truck;
vehicle characteristics of the first industrial truck;
one or more characteristics of an apparatus attached to the first industrial truck;
driving qualifications of a driver of the first industrial truck;
a type of goods transported or to be transported by the first industrial truck;
a weight of goods transported or to be transported by the first industrial truck;
a size of goods transported or to be transported by the first industrial truck;
operation time of the first industrial truck in the goods logistics facility;
an environment of the goods logistics facility drivable for the first industrial truck; and
traffic density of industrial trucks in the goods logistics facility.

14. The method according to claim 12, wherein the absolute position of the first industrial truck in the goods logistics facility and/or the direction of travel of the first industrial truck in the goods logistics facility is determined at regular time intervals.

15. The method according to claim 12 wherein, when the control device of the goods logistics facility determines that the adapted first virtual industrial truck extension zone and the adapted second virtual industrial truck extension zone partially overlap or touch one another, at least one of:

a warning message is generated at the first industrial truck;
the first industrial truck is braked; and
operation of the first industrial truck is controlled.

16. The method according to claim 15, wherein the warning message is shown on a display of the first industrial truck and/or the warning message is generated as an acoustic and/or mechanical warning signal.

* * * * *

UNITED STATES PATENT AND TRADEMARK OFFICE
CERTIFICATE OF CORRECTION

| | | |
|---|---|---|
| PATENT NO. | : 11,275,386 B2 | Page 1 of 1 |
| APPLICATION NO. | : 16/292447 | |
| DATED | : March 15, 2022 | |
| INVENTOR(S) | : Florian Grabbe et al. | |

It is certified that error appears in the above-identified patent and that said Letters Patent is hereby corrected as shown below:

In the Claims

In Column 9, Line 4, Claim 10, delete "further" between "claim 1," and "wherein,"

Signed and Sealed this
Seventh Day of June, 2022

*Katherine Kelly Vidal*

Katherine Kelly Vidal
*Director of the United States Patent and Trademark Office*